No. 615,675. Patented Dec. 13, 1898.
A. C. BROWNELL.
ROLLER BEARING.
(Application filed Nov. 6, 1897.)
(No Model.)
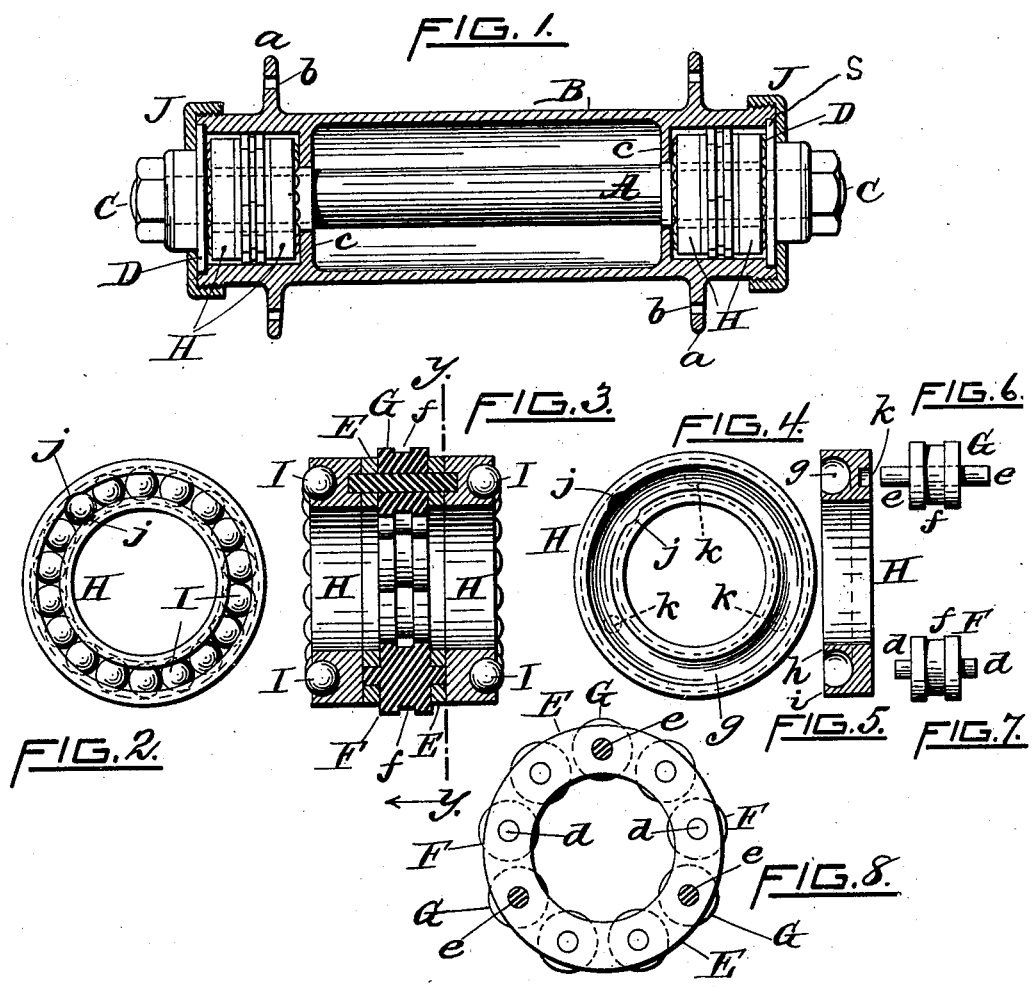

UNITED STATES PATENT OFFICE.

ALEXANDER C. BROWNELL, OF PROVIDENCE, RHODE ISLAND, ASSIGNOR OF ONE-HALF TO HENRY T. McDONALD, OF SAME PLACE.

ROLLER-BEARING.

SPECIFICATION forming part of Letters Patent No. 615,675, dated December 13, 1898.

Application filed November 6, 1897. Serial No. 657,621. (No model.)

*To all whom it may concern:*

Be it known that I, ALEXANDER C. BROWNELL, of the city and county of Providence, in the State of Rhode Island, have invented a certain new and useful Improvement in Roller-Bearings for the Wheels of Bicycles and other Vehicles; and I declare the following to be a specification thereof, reference being had to the accompanying drawings.

Like letters indicate like parts.

Figure 1 is a central longitudinal section of a hub of a bicycle-wheel with the axle, nuts, and roller-bearing cages in elevation. Fig. 2 is an end elevation of one of the ball-bearing rings, showing the balls mounted in the annular channel thereof. Fig. 3 is a central longitudinal section of one of the cages, showing both the rollers and balls mounted in operative position. Fig. 4 is an end elevation of said ball-bearing ring and illustrates the annular channel of the same and how the balls may be inserted in the channel. Fig. 5 is a view of said ring as seen partly in elevation and partly in section on the diameter thereof. Fig. 6 is a front elevation of one of the rollers with a journal on which it is rotatable. Fig. 7 is a front elevation of one of the rollers having journals integral therewith. Fig. 8 is a side elevation of the cage as seen on line $y\ y$ of Fig. 3 and illustrates the manner in which the rollers are mounted.

My invention relates to roller and ball bearings for the wheels of bicycles and other vehicles; and it consists in the combination, with a wheel-hub and the axle on which said hub is mounted, of a cage provided with rollers which are in rolling contact with a suitable bearing-surface of or connected with the axle and also with balls and a supporting-ring therefor on the sides of the cage, adapted to resist the end-thrust friction of the wheel-hub against suitable bearing-surfaces, which balls are loosely mounted and held in an annular channel of each ring, as hereinafter more particularly specified.

In the drawings, A is the axle of the bicycle-wheel, having its ends screw-threaded.

B is the hub of the bicycle-wheel, tubular in form and rotatable upon the axle A. The hub is screw-threaded at its ends. It has the annular exterior flanges $a\ a$, through the holes $b\ b$ of which the wire spokes of the wheel pass or are secured in the usual manner. The hub B also has the interior annular flanges $c\ c$, each with a central aperture, through which the cylindrical portion of the axle A passes. The hub B is also cut away at its ends to form a thin flange and a shoulder, as seen in Fig. 1.

C C are nuts engaging the screw-threaded ends of the axle A. Said nuts C have an interiorly-screw-threaded sleeve or tubular portion continuous therewith, as shown in Fig. 1.

D D are the annular bearing-rings, which fit upon the ends of the hub B within the annular recesses $s$, formed by the flanges there, respectively. Each ring D is held in position by means of the nut C.

In each hub there are provided two cages for the rollers and balls. Each cage E consists of two rings, between which rollers are mounted rotatably. Some of the rollers (indicated as F) have their journals $d\ d$ integral therewith, while others of the rollers, preferably three, (indicated as G,) have a central tubular bore through which a journal or pin $e$ loosely passes, so that said roller G may rotate thereon. The journals $d\ d$ of the rollers F extend through the rings of the cage E, so that their ends lie flush with the outer surfaces of the rings, as seen in Figs. 3 and 8. The journals or pins $e$, however, project slightly beyond the outer surfaces of the rings of the cage E, as illustrated in said figures. The rollers F G are so mounted that their peripheries extend slightly beyond the inner circumference of the rings of the cage E, as seen in Figs. 3 and 8. The rollers F and G have a central circumferential groove $f$.

On each end of the cage E is a ball-supporting ring H. This ring has an annular channel $g$ on its outer surface between two annular lips or flanges $h\ i$. The lips $h\ i$ are notched or slightly cut away, as at $j$. The ring has three (or more) sockets $k$, corresponding in number, size, and position with the pins or journals $e$ of the rollers G. Balls I are mounted loosely in the channel $g$ of the ring H.

Each ball is inserted in the enlarged space provided by the notches *j*, and the lips *h* and *i* confine the balls I within the channel *g*, as shown in Figs. 2 and 3.

The cage E and rings H are assembled as shown in Fig. 3, the journals *e* extending into and fitting snugly the sockets *k* of said rings H. The balls I have their external bearing against the bearing-rings D, and the rollers F G have their bearing on the cylindrical surface of the axle A. The balls I are useful to receive the end-thrust friction when the wheel is traveling on a curve, and the rollers F G furnish the bearing when the wheel is traveling in a straight direction or course.

The rollers F and G give a vertical rolling bearing upon the axle A, while the balls I furnish a lateral or endwise bearing against the rings D D. A cap J at the ends of the hub excludes dust from the balls, rollers, and bearings.

I do not wish to confine myself to the means shown for inserting the balls I in the channel *g* of the ring H, as other means are equally as effective, the idea or principle involved being the mounting of a sufficient number of balls loosely throughout the whole extent of the annular channel in the ring H, but confining them therein in such a manner as to prevent their accidental displacement or removal without, however, interfering with their rolling movement within the channel.

Instead of notching both the annular lips *h i* it is sufficient to notch but one of them, and the ball can be sprung into the channel through the opening thus formed.

The projection of the journals or pins *e e* beyond the outer surface of the rings H makes them useful as a fastening means to hold said rings to the cage E, which is accomplished by the snug engagement of said pins *e e* in the sockets *k k* of the ring H, as best shown in Fig. 3.

I claim as a novel and useful invention and desire to secure by Letters Patent—

1. In combination with the tubular hub of a bicycle-wheel and an axle for the same, which is screw-threaded at its ends, the nuts engageable at the ends of the axle, a ball-bearing ring at each end of the hub and fitting within an annular recess at the end of the hub, two cages each composed of two rings, with rollers rotatably mounted therein between said rings, a ring secured upon each side of each cage and each provided with an annular channel on its outer surface, and balls loosely mounted in said channels, all arranged and operating substantially as shown and for the purpose specified.

2. The combination of a cage, comprising two rings with rollers rotatably mounted therein between said rings, a ring secured upon each side of said cage and provided with an annular channel on its outer surface, and balls mounted loosely in said channels, substantially as shown.

3. The combination of a cage comprising two rings, pins extending between said rings and projecting beyond their outer surface, rollers loosely mounted on said pins, rollers having central trunnions or journals, integral therewith, which are mounted in said rings and a ring secured upon each side of said cage by means of said projecting pins of the rollers first mentioned, which are inserted and engaged in sockets of said outer rings, respectively, there being an annular channel in the outer surface of each of said rings, and balls loosely mounted in said channel, substantially as described.

4. The combination of a cage provided with rollers, a ring secured upon said cage upon the side thereof and provided with an annular channel and annular flanges on each side of said channel, which flanges are notched at two points opposite each other, and balls adapted to enter said channel through the notches thereof and to be loosely movable within said channel and under said flanges, substantially as set forth.

ALEXANDER C. BROWNELL.

Witnesses:
DANIEL W. FINK,
WARREN R. PERCE.